(12) United States Patent
Beck et al.

(10) Patent No.: US 9,715,001 B2
(45) Date of Patent: Jul. 25, 2017

(54) MOBILE LOCATION IN A REMOTE RADIO HEAD ENVIRONMENT

(75) Inventors: Andrew E. Beck, Ashburn, VA (US); Thomas B. Gravely, Herndon, VA (US); Carmine J. Pagano, II, Blairstown, NJ (US)

(73) Assignee: CommScope Technologies LLC, Hickory, NC (US)

( * ) Notice: Subject to any disclaimer, the term of this patent is extended or adjusted under 35 U.S.C. 154(b) by 662 days.

(21) Appl. No.: 13/443,142

(22) Filed: Apr. 10, 2012

(65) Prior Publication Data

US 2012/0315048 A1    Dec. 13, 2012

Related U.S. Application Data

(60) Provisional application No. 61/496,163, filed on Jun. 13, 2011.

(51) Int. Cl.
*H04B 10/00*    (2013.01)
*H04J 14/02*    (2006.01)
(Continued)

(52) U.S. Cl.
CPC ...... *G01S 5/0221* (2013.01); *H04B 10/25758* (2013.01); *H04J 14/08* (2013.01); *H04W 88/085* (2013.01)

(58) Field of Classification Search
CPC . G01S 5/0221; H04B 10/25758; H04B 10/02; H04W 88/085; H04J 14/08
(Continued)

(56) References Cited

U.S. PATENT DOCUMENTS

| 3,150,372 A | 9/1964 | Groth, Jr. |
| 3,659,085 A | 4/1972 | Potter et al. |

(Continued)

FOREIGN PATENT DOCUMENTS

| JP | 06-347529 | 12/1994 |
| WO | 2006088472 A1 | 8/2006 |

OTHER PUBLICATIONS

Y. Zhao, "Standardization of Mobile Phone Positioning for 3G Systems," IEEE Communications Magazine, Jul. 2002, pp. 108-116.

(Continued)

*Primary Examiner* — Ken N Vanderpuye
*Assistant Examiner* — Abbas H Alagheband
(74) *Attorney, Agent, or Firm* — Fogg & Powers LLC

(57) ABSTRACT

A base station includes an antenna, a radio transceiver, an optical splitter, an optical-to-electrical converter, and a computation module. The antenna may be mounted to a tower and may be configured to receive an RF signal. The radio transceiver may be coupled to the antenna and mounted near the top of the tower. The transceiver may be configured to convert the RF signal to a baseband signal for transmission over a fiber optic link as a first optical signal. The splitter may be configured to split the first optical signal, received via the fiber optic link, into a second optical signal and a third optical signal. The optical-to-electrical converter may be configured to convert the second optical signal into an electrical digital signal including in-phase and quadrature (I/Q) data. The computation module may be configured to compute, based on the I/Q data, signal measurements for location of a mobile station.

12 Claims, 13 Drawing Sheets

(51) Int. Cl.
*G01S 5/02* (2010.01)
*H04B 10/2575* (2013.01)
*H04J 14/08* (2006.01)
*H04W 88/08* (2009.01)

(58) Field of Classification Search
USPC ........ 398/98, 115, 116, 117; 455/404.2, 405, 455/440
See application file for complete search history.

(56) References Cited

U.S. PATENT DOCUMENTS

| | | |
|---|---|---|
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,691 A * | 5/1996 | Darcie ................ H04W 88/085 370/331 |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,710,651 A * | 1/1998 | Logan, Jr. ........ H04B 10/25758 398/106 |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,577,786 B1 * | 6/2003 | Cappiello ................ G01J 3/02 385/24 |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,674,966 B1 * | 1/2004 | Koonen ........... H04B 10/25752 370/318 |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,785,558 B1 * | 8/2004 | Stratford ................ H04L 1/0625 455/522 |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,084,809 B2 * | 8/2006 | Hockley, Jr. ........... H04B 1/001 375/219 |
| 7,085,497 B2 * | 8/2006 | Tiemann .......... H04B 10/25755 398/107 |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,296,753 B1 * | 11/2007 | Zucker ..................... 235/462.48 |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,529,215 B2 * | 5/2009 | Osterling ................ H04L 69/18 370/338 |

(56) References Cited

U.S. PATENT DOCUMENTS

| | | | |
|---|---|---|---|
| 7,546,084 B2 | 6/2009 | Kennedy, Jr. et al. | |
| 7,593,738 B2 | 9/2009 | Anderson | |
| 7,725,111 B2 | 5/2010 | Dressler et al. | |
| 7,734,298 B2 | 6/2010 | Bhattacharya et al. | |
| 7,753,278 B2 | 7/2010 | Spain, Jr. et al. | |
| 7,796,966 B2 | 9/2010 | Bhattacharya et al. | |
| 7,848,762 B2 | 12/2010 | Gordon et al. | |
| 7,899,467 B2 | 3/2011 | Feuerstein et al. | |
| 8,013,785 B2 | 9/2011 | Bhattacharya et al. | |
| 8,068,802 B2 | 11/2011 | Bhattacharya et al. | |
| 8,068,855 B2 | 11/2011 | Dressler et al. | |
| 8,106,817 B2 | 1/2012 | Bhattacharya et al. | |
| 8,106,818 B2 | 1/2012 | Bhattacharya et al. | |
| 8,155,394 B2 | 4/2012 | Allegra et al. | |
| 8,406,178 B2 * | 3/2013 | Tan | H04B 10/25759 370/328 |
| 2002/0048071 A1 * | 4/2002 | Suzuki | H04B 10/25755 398/141 |
| 2002/0172223 A1 | 11/2002 | Stilp et al. | |
| 2003/0015707 A1 * | 1/2003 | Bosco | H01L 21/8258 257/73 |
| 2003/0064734 A1 | 4/2003 | Stilp et al. | |
| 2003/0139188 A1 | 7/2003 | Chen et al. | |
| 2003/0161637 A1 * | 8/2003 | Yamamoto | H04J 14/025 398/167.5 |
| 2003/0190919 A1 | 10/2003 | Niemenmaa | |
| 2003/0203738 A1 | 10/2003 | Brown et al. | |
| 2004/0008138 A1 * | 1/2004 | Hockley, Jr. | G01S 5/0072 342/357.48 |
| 2004/0043775 A1 | 3/2004 | Kennedy, Jr. et al. | |
| 2004/0096222 A1 * | 5/2004 | Cagenius | H04B 10/25758 398/115 |
| 2004/0132466 A1 | 7/2004 | Kennedy, Jr. et al. | |
| 2004/0198451 A1 * | 10/2004 | Varghese | H04B 1/18 455/562.1 |
| 2004/0203539 A1 | 10/2004 | Benes et al. | |
| 2004/0203921 A1 | 10/2004 | Bromhead et al. | |
| 2004/0208590 A1 * | 10/2004 | Nabors | H04B 10/25752 398/115 |
| 2004/0218664 A1 | 11/2004 | Kennedy, Jr. et al. | |
| 2004/0252752 A1 | 12/2004 | Kennedy, Jr. et al. | |
| 2005/0058182 A1 | 3/2005 | Kennedy, Jr. et al. | |
| 2005/0105552 A1 * | 5/2005 | Osterling | H04L 69/18 370/466 |
| 2005/0136945 A1 | 6/2005 | Kennedy, Jr. et al. | |
| 2005/0164712 A1 | 7/2005 | Kennedy, Jr. et al. | |
| 2005/0192026 A1 | 9/2005 | Carlson et al. | |
| 2006/0003695 A1 | 1/2006 | Kennedy, Jr. et al. | |
| 2006/0003775 A1 | 1/2006 | Bull et al. | |
| 2006/0030333 A1 | 2/2006 | Ward et al. | |
| 2006/0116130 A1 | 6/2006 | Kennedy, Jr. et al. | |
| 2006/0125695 A1 | 6/2006 | Kennedy, Jr. et al. | |
| 2006/0141998 A1 | 6/2006 | Kennedy, Jr. et al. | |
| 2006/0154607 A1 | 7/2006 | Kennedy, Jr. et al. | |
| 2006/0240836 A1 | 10/2006 | Kennedy, Jr. et al. | |
| 2007/0087689 A1 | 4/2007 | Kennedy, Jr. et al. | |
| 2007/0111746 A1 | 5/2007 | Anderson et al. | |
| 2007/0140177 A1 * | 6/2007 | Li | H01Q 1/246 370/335 |
| 2007/0155401 A1 | 7/2007 | Ward et al. | |
| 2007/0155489 A1 | 7/2007 | Beckley et al. | |
| 2007/0202885 A1 | 8/2007 | Kennedy, Jr. et al. | |
| 2008/0132244 A1 | 6/2008 | Anderson et al. | |
| 2008/0132247 A1 | 6/2008 | Anderson et al. | |
| 2008/0137524 A1 | 6/2008 | Anderson et al. | |
| 2008/0158059 A1 | 7/2008 | Bull et al. | |
| 2008/0160952 A1 | 7/2008 | Bull et al. | |
| 2008/0160953 A1 | 7/2008 | Mia et al. | |
| 2008/0161015 A1 | 7/2008 | Maloney et al. | |
| 2008/0248811 A1 | 10/2008 | Maloney et al. | |
| 2008/0261611 A1 | 10/2008 | Mia et al. | |
| 2008/0261612 A1 | 10/2008 | Mia et al. | |
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2009/0233625 A1 * | 9/2009 | Ferguson | H04W 64/00 455/456.5 |
| 2009/0297146 A1 * | 12/2009 | Pessoa | H04W 88/14 398/45 |
| 2010/0130225 A1 | 5/2010 | Alles et al. | |
| 2011/0171973 A1 | 7/2011 | Beck et al. | |
| 2012/0076500 A1 * | 3/2012 | Notargiacomo | H04B 10/25758 398/116 |
| 2012/0236774 A1 * | 9/2012 | Guey | H04W 28/16 370/312 |
| 2012/0269509 A1 * | 10/2012 | Hultermans | H04B 10/25756 398/43 |
| 2013/0028303 A1 * | 1/2013 | Rofougaran | H04B 1/001 375/219 |

OTHER PUBLICATIONS

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Rick Roberts, "Project: IEEE P802.15 Working Group for Wireless Personal Area Networks (WPANS)," Harris Corporation, Melbourne Florida, Oct. 4, 2004, pp. 1-11.

(56) References Cited

OTHER PUBLICATIONS

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University, Apr. 16-18, 1997, 4pages.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

\* cited by examiner

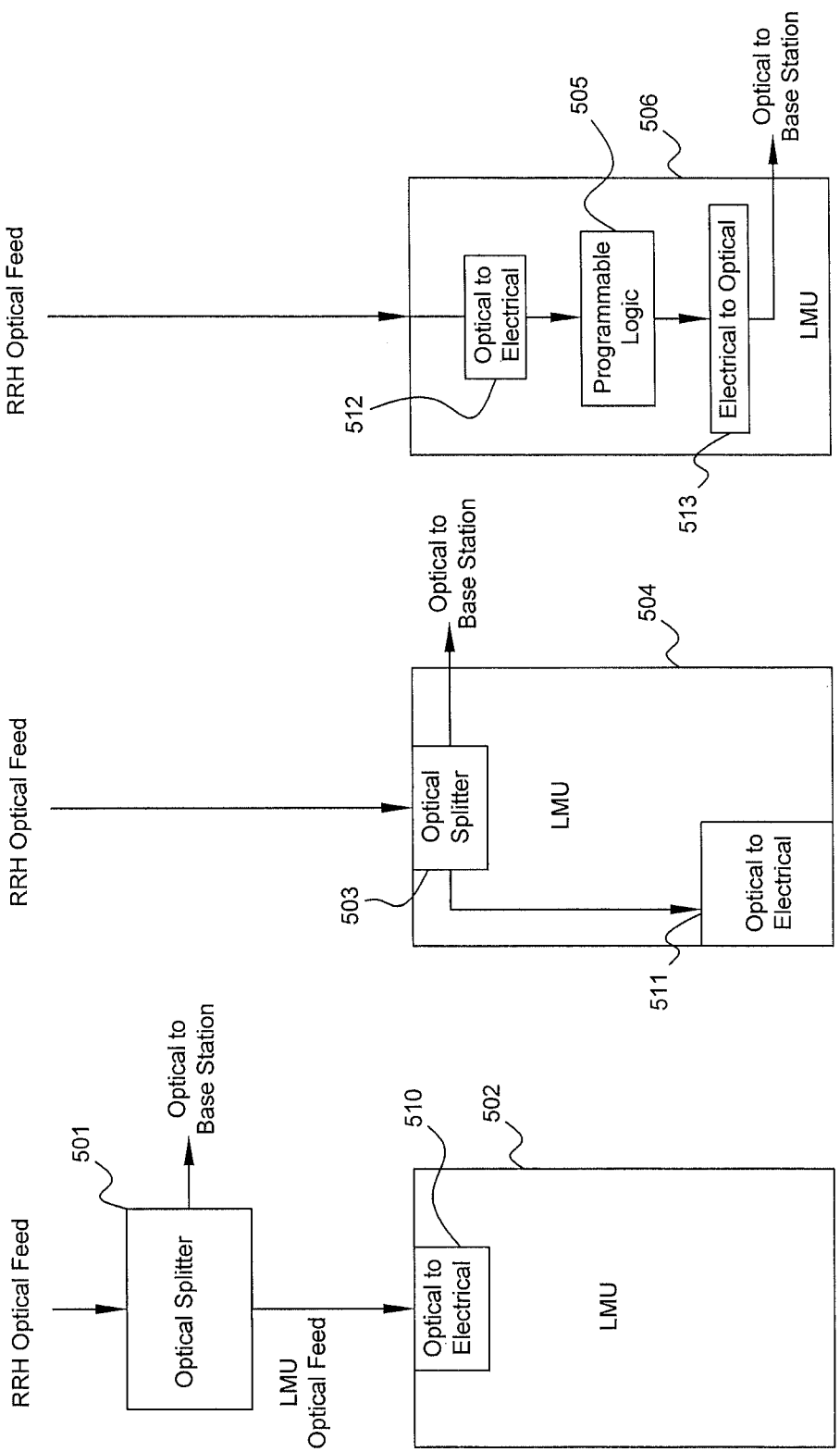

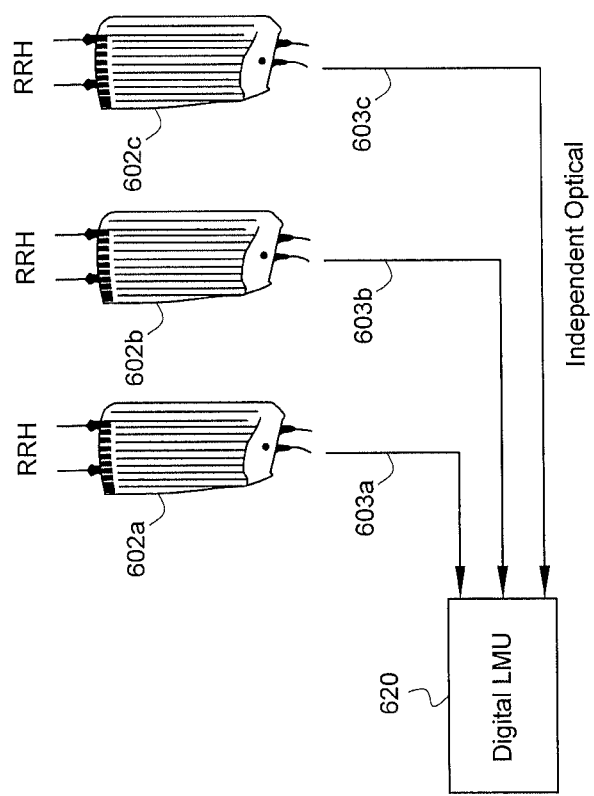

MOBILE LOCATION IN A REMOTE RADIO HEAD ENVIRONMENT

PRIORITY CLAIM

This application claims priority under 35 U.S.C. §119(e) from U.S. Provisional Pat. Ser. No. 61/496,163 entitled "Mobile Location in a Remote Radio Head Environment" filed Jun. 13, 2011, the entirety of which is hereby incorporated by reference herein.

BACKGROUND

Systems and methods for location of mobile stations (mobile devices) using sensors that perform measurements on uplink signals are known, e.g., as described at U.S. Pat. No. 5,317,323, "Passive High Accuracy Geolocation," to Kennedy et al. Such sensors connect to existing base station antenna systems, repeater or distributed antenna systems, or antenna systems dedicated to the sensors, e.g., as described at U.S. Pat. No. 7,546,084, "System and method of operation for network overlay geolocation system with repeaters," to Kennedy et al.

FIG. 1 is a block diagram of a traditional base station architecture. In general, base stations are composed of three main subsystems: an antenna system 101 for receiving/transmitting radio frequency (RF) signals; one or more radio transceivers 102 for conversion to/from baseband signals; and one or more baseband processors 103 for message processing. A typical traditional base station is configured with the antenna system positioned high on a structure 104 such as a tower, building, mountain, etc. The radio transceiver and baseband equipment are housed in an easily accessible cabinet 105, which may be positioned on the ground. The RF signals from the antenna are fed down the structure using a coaxial cable 106. The RF signals typically remain at the RF frequency all the way down the structure. In this architecture a Location Measurement Unit (LMU) sensor 107, installed to perform measurements to support mobile location, can be connected to the RF signals in the equipment cabinet 105 prior to the radio transceiver. This architecture facilitates full access to the mobile uplink signals prior to any signal conversion and processing by the base station.

SUMMARY

In an embodiment of the present disclosure, a base station includes an antenna, a radio transceiver, an optical splitter, an optical-to-electrical converter, and a computation module. The antenna may be mounted to a structure and may be configured to receive a radio frequency (RF) signal. The radio transceiver may be coupled to the antenna and mounted to the structure. The transceiver may be configured to convert the RF signal to a baseband signal for transmission over a fiber optic link as a first optical signal. The splitter may be configured to split the first optical signal, received via the fiber optic link, into a second optical signal and a third optical signal. The optical-to-electrical converter may be configured to convert the second optical signal into an electrical digital signal including in-phase and quadrature (I/Q) data. The computation module may be configured to compute, based on the I/Q data, signal measurements for location of a mobile station.

In some embodiments, a base station includes an antenna, a radio transceiver, and a location measurement unit (LMU). The antenna may be mounted to a structure and may be configured to receive a first RF signal. The radio transceiver may be coupled to the antenna and may be mounted to the structure. The transceiver may be configured to convert the first RF signal to a baseband signal for transmission over a first fiber optic link as a first optical signal. The LMU may be coupled to the transceiver via the first fiber optic link. The LMU may include an optical-to-electrical converter and a computation module. The optical-to-electrical converter may be configured to convert the first optical signal into an electrical digital signal including in-phase and quadrature (I/Q) data. The computation module may be configured to compute, based on the I/Q data, signal measurements for location of a mobile station.

In some embodiments, a method includes receiving an RF signal at an antenna mounted to a structure. The RF signal may be converted to a baseband signal at a radio transceiver that is mounted to the structure. The baseband signal may be sent over a fiber optic link as a first optical signal. The first optical signal may be split into a second optical signal and a third optical signal. The second optical signal may be converted into an electrical digital signal including in-phase and quadrature (I/Q) data. Based on the I/Q data, measurements for location of a mobile station may be computed.

In some embodiments, a method includes receiving a first RF signal at an antenna mounted to a structure. The first RF signal may be converted to a baseband signal at a radio transceiver that is mounted to the structure. The baseband signal may be sent over a first fiber optic link as a first optical signal. The first optical signal may be converted into an electrical digital signal including in-phase and quadrature (I/Q) data. Based on the I/Q data, measurements for location of a mobile station may be computed.

In some embodiments, a base station includes at least one antenna mounted to a structure, multiple radio transceivers coupled to the antenna(s), an optical splitter, and a location measurement unit (LMU). The antenna(s) may be configured to receive at least one RF signal. The transceivers may be mounted to the structure. The transceivers may be configured to convert the RF signals to baseband data and format the baseband data for transmission over a fiber optic link as a first optical signal, e.g., using time division multiplexing or packet-based formatting. The splitter may be configured to split the first optical signal, received via the fiber optic link, into a second optical signal and a third optical signal. The LMU may include an optical-to-electrical converter, configured to convert the second optical signal into an electrical digital signal including in-phase and quadrature (I/Q) data, and a computation module configured to compute, based on the I/Q data, measurements for location of a mobile station. The optical splitter may be located external to the LMU or internal to the LMU.

In some embodiments, a base station includes at least one antenna mounted to a structure, multiple radio transceivers coupled to the antenna(s), and a location measurement unit (LMU). The antenna(s) may be configured to receive at least one RF signal. The transceivers may be mounted to the structure and may be configured to convert the RF signals to baseband data and format the baseband data for transmission over a fiber optic link as a first optical signal, e.g., using time division multiplexing or packet-based formatting. The LMU may include an optical-to-electrical converter, configured to convert the first optical signal into an electrical digital signal including in-phase and quadrature (I/Q) data, and a computation module configured to compute, based on the I/Q data, measurements for location of a mobile station.

In some embodiments, a base station includes at least one antenna mounted to a structure, multiple radio transceivers coupled to the antenna(s), an optical splitter, and a location measurement unit (LMU). The antenna(s) may be configured to receive at least one RF signal. The transceivers may be mounted to the structure. Each transceiver may be configured to convert a corresponding RF signal to a baseband signal for transmission over a fiber optic link as an optical output signal. The optical output signals corresponding to the respective transceivers may form a first plurality of optical signals. The splitter may be configured to split the first plurality of optical signals, received via the fiber optic links, into a second plurality of optical signals and a third plurality of optical signals, with each signal in the first plurality of optical signals being split into one signal in the second plurality of optical signals and one signal in the third plurality of optical signals. The LMU may include an optical-to-electrical converter, configured to convert the second plurality of optical signals into at least one electrical digital signal including in-phase and quadrature (I/Q) data, and a computation module configured to compute, based on the I/Q data, measurements for location of a mobile station. The optical splitter may be located external to the LMU or internal to the LMU.

In some embodiments, a base station includes an antenna mounted to a structure, a radio transceiver, an optical-to-electrical converter, a splitter, and a location measurement unit. The antenna may be configured to receive an RF signal. The radio transceiver may be coupled to the antenna and may be mounted to the structure. The transceiver may be configured to convert the RF signal to a baseband signal for transmission over a fiber optic link as an optical signal. The optical-to-electrical converter may be configured to convert the optical signal into a first electrical digital signal including in-phase and quadrature (I/Q) data. The splitter may be configured to split the first electrical digital signal into a second electrical digital signal and a third electrical digital signal. The second and third electrical digital signals may include the I/Q data. The LMU may be configured to compute, based on the I/Q data of the second electrical digital signal, measurements for location of a mobile station.

BRIEF DESCRIPTION OF THE DRAWINGS

The following will be apparent from elements of the figures, which are provided for illustrative purposes and are not necessarily to scale.

FIGS. 5A-5G illustrate processing of an RRH optical feed in accordance with various embodiments.

FIGS. 6A-6B illustrate the use of multiple remote radio heads in accordance with some embodiments.

DETAILED DESCRIPTION

This description of certain exemplary embodiments is intended to be read in connection with the accompanying drawings, which are to be considered part of the entire written description.

Figure 1:
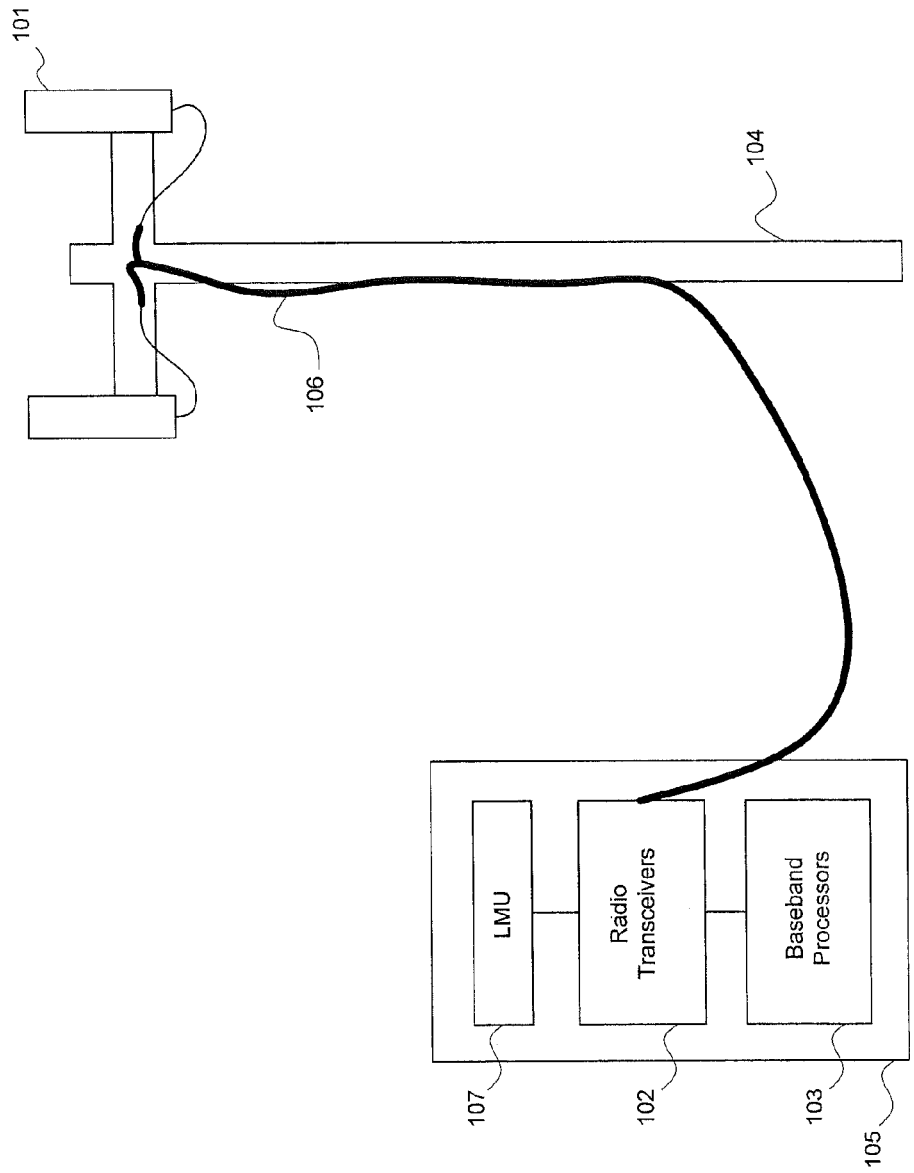
FIG. 1 is a block diagram of a traditional base station architecture.
Figure 2:
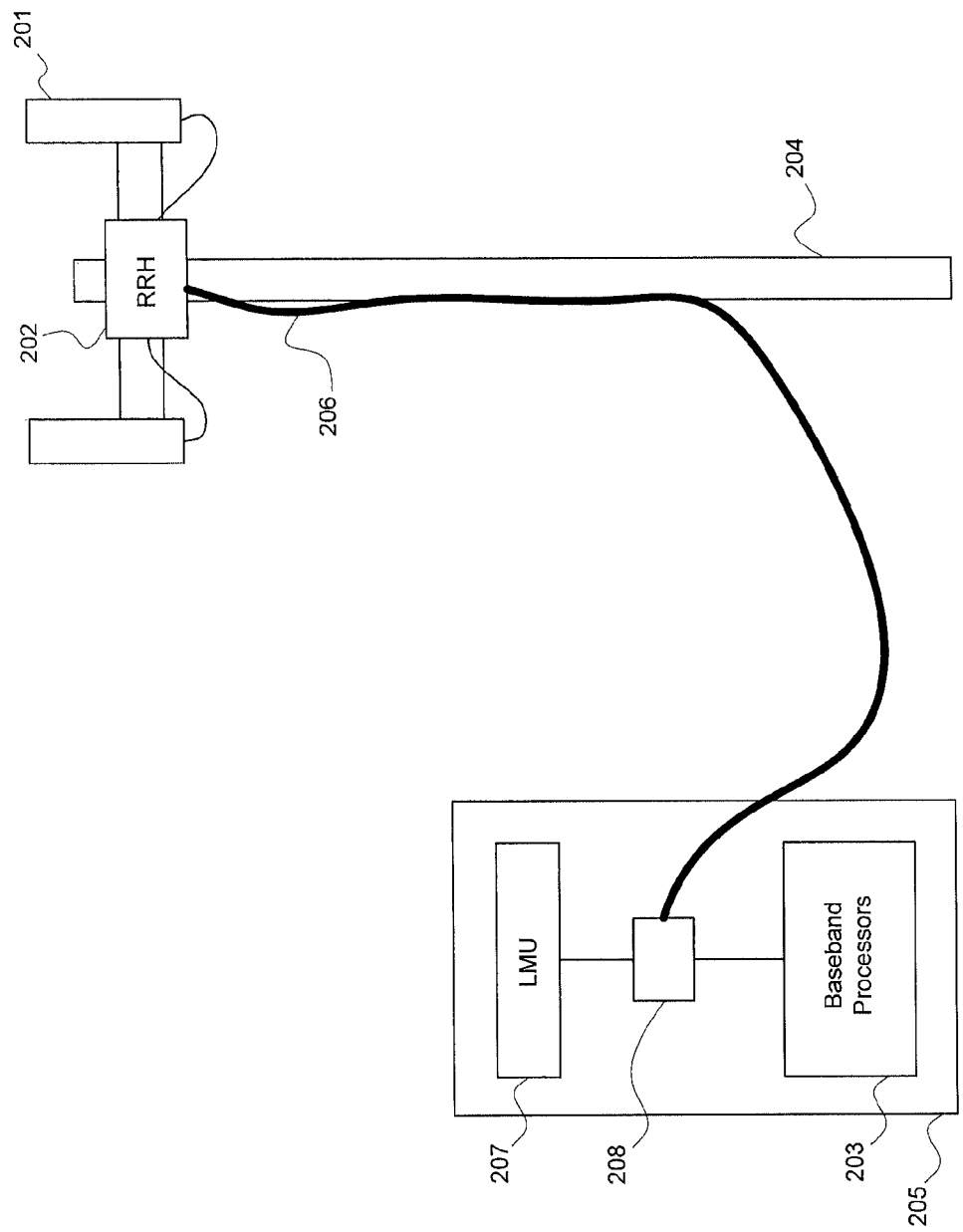
FIG. 2 is a block diagram of a base station architecture in a remote radio head (RRH) configuration with an optical coupler in accordance with various embodiments.

FIG. 2 is a block diagram of a base station architecture in a remote radio head (RRH) configuration with an optical coupler in accordance with various embodiments. Radio transceiver equipment 202 is installed remotely, proximate to an antenna 201, and is mounted to a structure 204 (e.g., a tower, building, tree, or other structure), e.g., near the top of the structure. Although FIG. 2 shows the transceiver mounted near the top of structure 204, the transceiver may be mounted at other positions of the structure, e.g., approximately midway between the bottom and top of the structure. Signaling between the radio transceiver and the baseband unit located in a cabinet 205 (which may be located physically separated from the transceiver, hence the term "remote radio head") are typically conducted over a digital fiber optic cable 206 and are not at a radio frequency. The RRH configuration of FIG. 2 offers several advantages over the traditional architecture of FIG. 1, including a lower implementation cost for the fiber optic cable 206 as opposed to coaxial cable 106 running down the structure, and increased performance by placing the radio equipment closer to the antennas, thereby eliminating or mitigating any coaxial cable insertion loss.

In the remote radio head (RRH) environment, a traditional LMU located within the accessible equipment cabinet 205 does not have a RF interface point. An LMU may be installed at or near the top of the structure with the radio transceiver equipment 202, but such an installation comes with consequences. The LMU would have to be environmentally hardened such that it can withstand an outdoor installation, or a new environmentally controlled cabinet would have to be installed on the structure to house the LMU. In such an installation, RF connection points would have to be created either directly on the RF transceiver or before the RF transceivers in the processing path. Both of these options may entail additional installation and maintenance costs. Alternatively, RF splitters may be installed on the existing antenna system to provide a tap point for the LMU, and new coax cabling may be installed on the structure to facilitate an LMU installed in the equipment cabinet. Such an approach may entail the additional cost of the LMU coaxial cabling system and defeats some of the cost and performance savings recognized by the RRH system.

Various embodiments of the present disclosure provide an LMU configuration capable of cost efficient installation and operation within a RRH environment. In various embodiments, an LMU such as LMU 207 includes an optical interface (shown in subsequent figures) to connect to the RRH fiber optic cable(s). Such an LMU is connected into the cable via an optical coupler 208 such that the optical signals may be provided to the base station's baseband processors 203 as well as to the LMU 207. In some embodiments, a passive coupler may be installed external or internal to the LMU. In other embodiments, an active coupling module may be installed internal to the LMU.

Typically, two optical interfaces form the connection between the baseband processors and the RRH, with one interface supporting messaging from the baseband processors to the RRH (the downlink connection) and the second interface supporting messaging from the RRH to the baseband processors (the uplink connection). In some embodiments, the LMU may couple into the uplink optical cable. LMU measurements are typically made on the mobile uplink signaling. The LMU may also couple into the downlink optical cable, which may facilitate the LMU's access to all RRH data (e.g., control and payload data) from the baseband processor as well as facilitate the function of allowing the LMU to insert its own control information to the RRH. For example, the LMU may configure the RRH to process RF channels in addition to those required by the baseband processors; these RF channels may be useful for LMU location, but ignored by the baseband processors.

Common within the industry are two protocols used for the optical interface for remote radio heads: Common Public Radio Interface (CPRI), and Open Base Station Architecture Initiative (OBSAI). Both of these protocols provide a sampled complex data stream from the one or more RRH units via an optical cable to baseband equipment. This complex I/Q data is used by the LMU for signal processing. A third protocol, Open Radio equipment Interface (ORI), is under development by industry standard groups and will also provide complex I/Q data that can be used in various embodiments for location processing.

Figure 3:
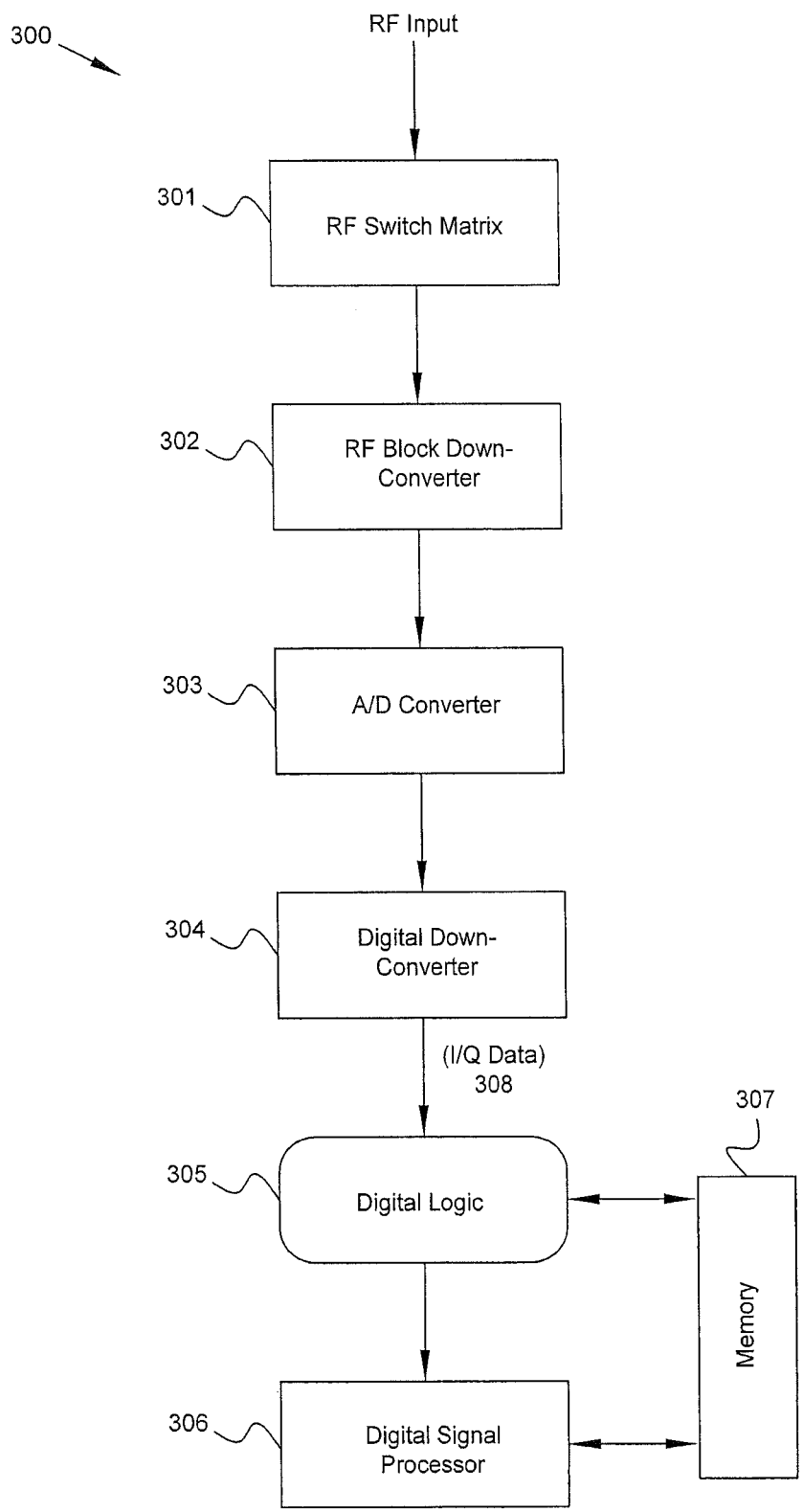
FIG. 3 is a block diagram of a traditional location measurement unit (LMU).

FIG. 3 is a block diagram of a traditional LMU 300 that may be used to connect to a non-RRH base station with an analog RF signal as the input. This signal is switched at an RF switch matrix 301, downconverted by a wideband block down-converter 302, sampled by a high speed analog to digital converter 303, and supplied to a digital downconverter 304 to provide baseband complex I/Q signal samples 308. The I/Q samples are processed by a digital signal processor (DSP) 306 to achieve measurements relevant to location. Variants of digital logic 305 and memory 307 may be optionally used for efficient processing of the I/Q data. The digital logic may be implemented in a field programmable gate array (FPGA), application specific standard product (ASSP), or application specific integrated circuit (ASIC), for example. Digital logic 305, DSP 306, and memory 307 may be part of a computation module that is configured to compute, based on the I/Q data, signal measurements for location of a mobile station.

Figure 4:
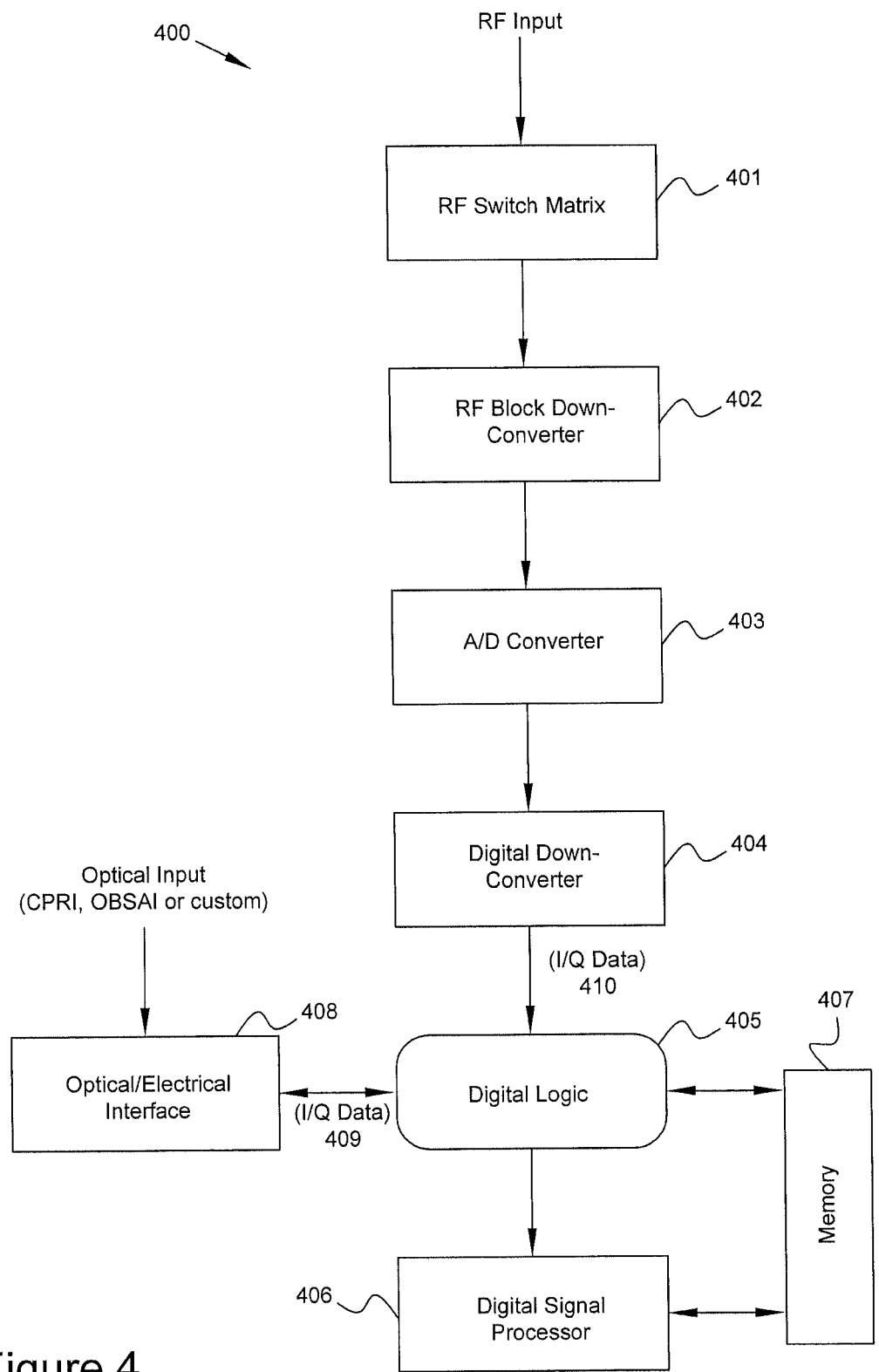
FIG. 4 is a block diagram of an LMU that facilitates signal processing in an RRH environment in accordance with various embodiments.

FIG. 4 is a block diagram of an LMU 400 that facilitates signal processing in an RRH environment in accordance with various embodiments. An optical to electrical converter 408 accepts the fiber optic cable from the RRH feed and converts the optical data to electrical digital data. This electrical digital data, which includes I/Q data 409, may be provided via CPRI, OBSAI or a custom digital data interface from the RRH to the base station. This data is fed into the LMU digital logic 405 to extract the I/Q data for signal processing. The I/Q data is similar to that constructed in the non-RRH LMU. The I/Q data may vary by sample rate or the number of bits sampled, but fundamentally it remains a complex representation of the original RF signal. An LMU 400 that has this capability to process digital data from an optical interface may be referred to as a digital LMU.

The I/Q signal data is typically packaged in the optical data stream into a container, time division multiplexed by RRH antenna and/or the RF spectrum being digitized. The LMU extracts the container(s) of interest for signal processing based on the relevance to location. In embodiments, the programmable logic 405 and/or the digital signal processor 406 may perform this container extraction.

As shown in FIG. 4, the digital LMU 400 may include the RF downconversion hardware of FIG. 3 (e.g., switch matrix 401, RF block downconverter 402, A/D converter 403, and digital downconverter 404) in addition to the optical interface. This may be useful in base station environments that do not use a RRH for one air standard (e.g. 2G GSM) but do use a RRH for a second air standard (e.g. 3G UMTS). In such an example, one LMU could support both air interfaces in some embodiments.

In a deployment scenario where only RRH units are installed at a base station, the LMU may be constructed with only the optical interface, removing the RF down-conversion hardware, which may yield savings in terms of LMU equipment cost, power, and space.

An optical interface to the LMU may be achieved via many different techniques. An optical splitter may be used to send the optical signal to both the LMU and the baseband processor. The optical signal may first be converted to electrical and sent to both the LMU and the baseband processor. The interface to the baseband processor (from the LMU or splitter) may be optical or electrical (via coaxial cable). The optical splitter and optical to electrical converter may be internal or external to the LMU.

Figure 5D:
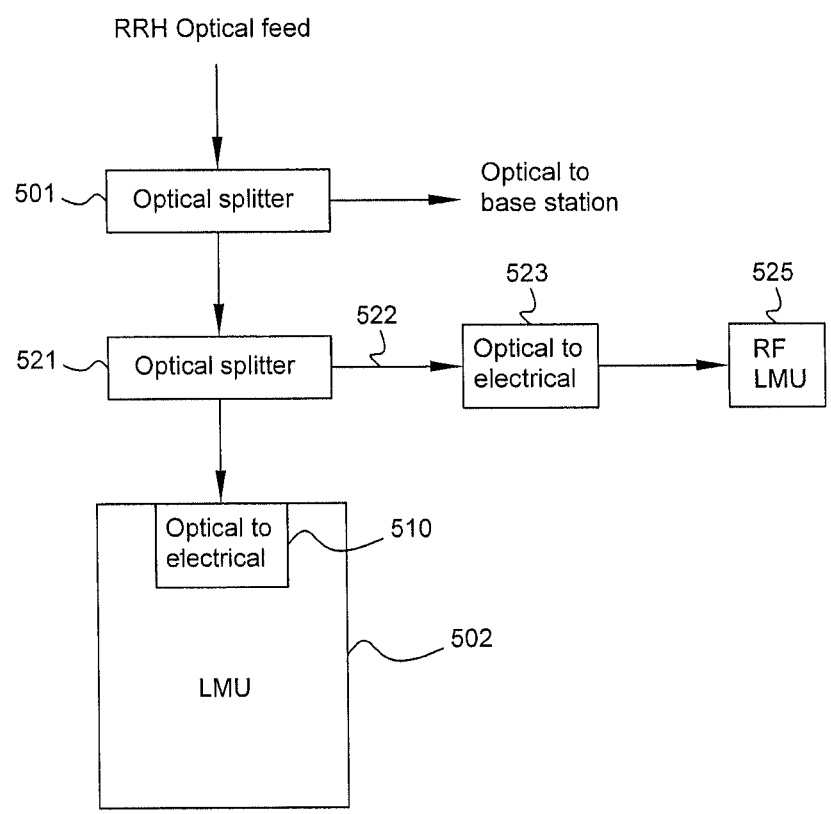

Several examples for implementing these connections in accordance with various embodiments are shown in FIGS. 5A-5G. FIGS. 5A-5G do not show an antenna and RRH unit for graphical convenience; an antenna and RRH unit as in FIG. 2 may be used in these cases. In FIG. 5A, an optical splitter 501 is installed external to LMU 502. An optical to electrical converter 510 converts an optical signal to an electrical digital signal including I/Q data. In FIG. 5B, splitter 503 is installed internal to LMU 504. An optical to electrical converter 511 converts an optical signal to an electrical digital signal including I/Q data. FIGS. 5A and 5B show passive coupling configurations. In the implementations of FIGS. 5A and 5B, an optical output from splitter 501 or 503 may be provided to a baseband processor configured to process a message represented by such an optical output. In FIG. 5C, the programmable logic 505 within LMU 506 is inserted within the optical feed line chain. An optical to electrical converter 512 permits the logic 505 to extract the I/Q data of interest for LMU processing, and all data is passed to the baseband base station equipment. The configuration of FIG. 5C is referred to as an "active" coupling configuration, where the LMU is actively involved in processing the signals that are passed to the base station. The base station data passes through the LMU, and the LMU has the capability to directly impact the data if desired (e.g., using programmable logic 505) before such data is passed to the base station. In contrast, in FIGS. 5A and 5B the LMU is positioned passively to the side, and the base station data passes by via the optical splitter, without undergoing location measurement processing at a logic unit of the LMU. In FIG. 5C, this connection from LMU 506 to the base station may be optical (e.g., using electrical to optical converter 513 and a different fiber optic link than the fiber optic link from the transceiver to the LMU) or digital via coaxial cable into the baseband processors. This connection may also be modulated and upconverted to RF and passed to a RF band processor via coaxial cable. The capability to sending the RF signal to a base station or LMU at RF for subsequent processing (e.g., location measurement determinations) provides additional flexibility in some embodiments. Typically, such modulation is implemented separately from upconversion. Alternatively, upconversion may not be needed for baseband message processing.

One advantage of the implementation in FIG. 5A is that any maintenance to the LMU (such as a replacement) does not interrupt or impact the signal to the base station. The implementation in FIG. 5B does not directly have this advantage, but offers a smaller, more integrated package. The implementation in FIG. 5C offers the flexibility of modifying the digital signaling within the LMU programmable logic prior to feeding the base station. This may involve repackaging or reorganizing the digital data on the optical interface. An optical switch may be used to provide an LMU bypass mode to achieve the maintenance advantage of FIG. 5A's implementation in the implementations of FIGS. 5B-5C.

In some embodiments, an optical splitter and an optical to electrical converter may provide an RF signal for processing by a conventional RF LMU. In FIG. 5D, an optical splitter 521 splits an optical signal received from splitter 501. Signal 522 undergoes optical to electrical conversion at converter 523 and may be processed by a conventional RF LMU 525. LMU 502 is optional in the configuration of FIG. 5D. IF LMU 502 is used in the configuration of FIG. 5D, it may function similarly as LMU 502 of FIG. 5D; if it is not used, optical splitter 521 may be avoided, and optical splitter 501 may send an optical signal directly to optical to electrical converter 523.

Figure 5E:
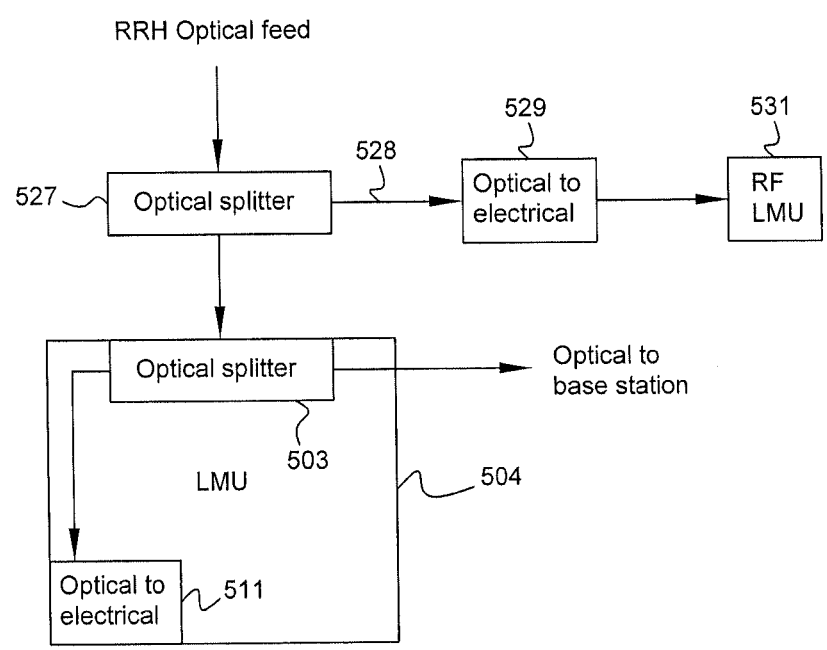

FIG. 5E shows an optical splitter 527 providing a signal 528, which is converted to electrical at converter 529 for processing by a conventional RF LMU 531. LMU 504 is optional in the configuration of FIG. 5E. If LMU 504 is used in the configuration of FIG. 5E, it may function similarly as LMU 504 of FIG. 5B; if it is not used, optical splitter 527 may be avoided, and the RRH optical feed may be provided directly to optical to electrical converter 529.

Figure 5F:
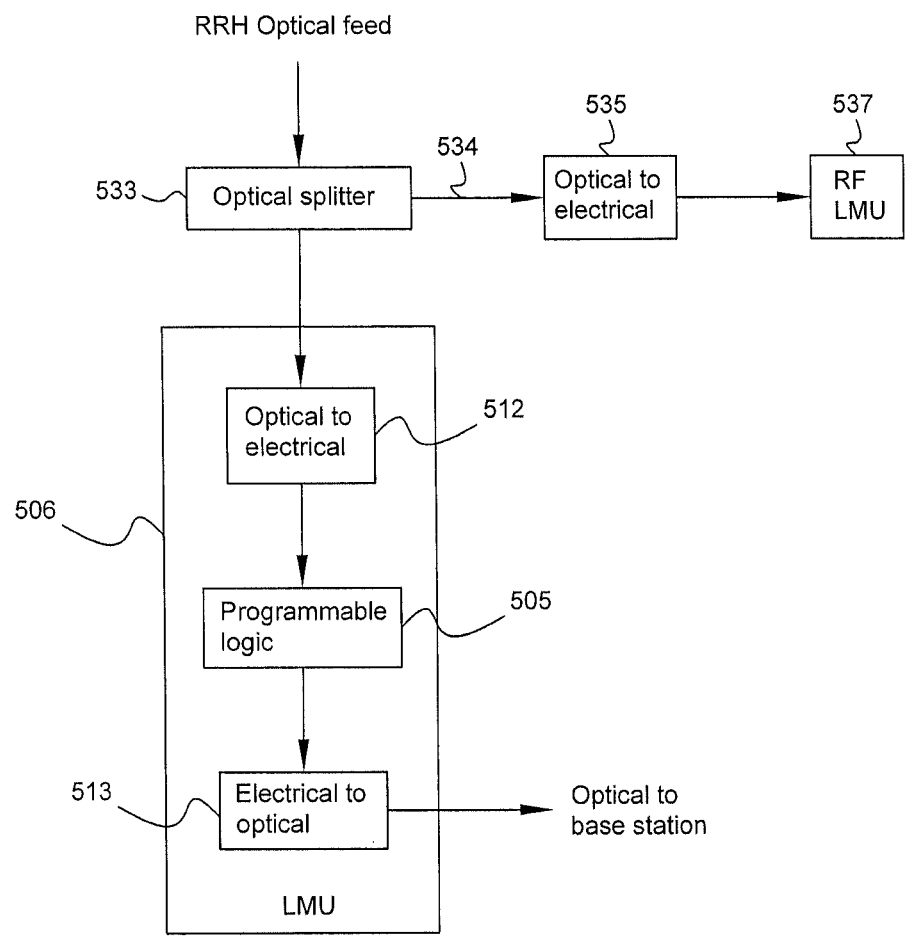

FIG. 5F shows an optical splitter 533 providing a signal 534, which is converted to electrical at converter 535 for processing by a conventional RF LMU 537. LMU 506 is optional in the configuration of FIG. 5F. If LMU 506 is used in the configuration of FIG. 5F, it may function similarly as LMU 506 of FIG. 5C; if it is not used, optical splitter 533 may be avoided, and the RRH optical feed may be provided directly to optical to electrical converter 535.

Figure 5G:
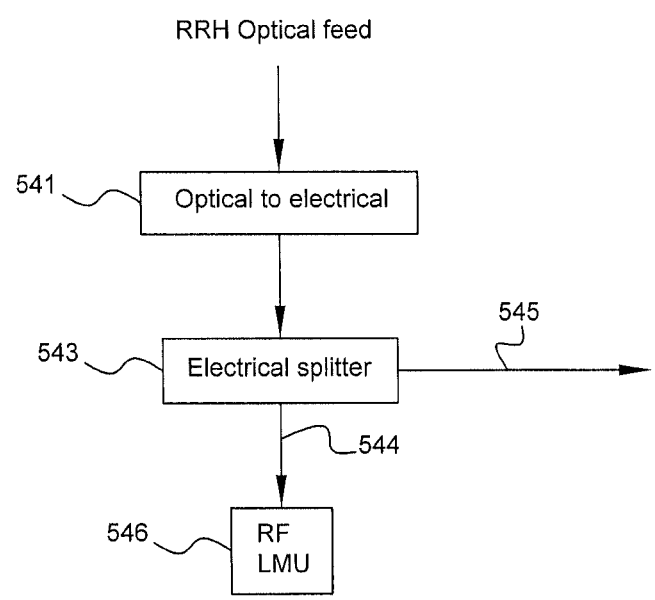

FIG. 5G shows a configuration in which the RRH optical feed is converted from optical to electrical at converter 541. Splitter 543 passes electrical signal 544 to a conventional RF LMU 546. Electrical signal 545 may be passed to a base station.

Thus, embodiments of the present disclosure provide flexible configurations that enable use of various types of LMUs.

Figure 6A:
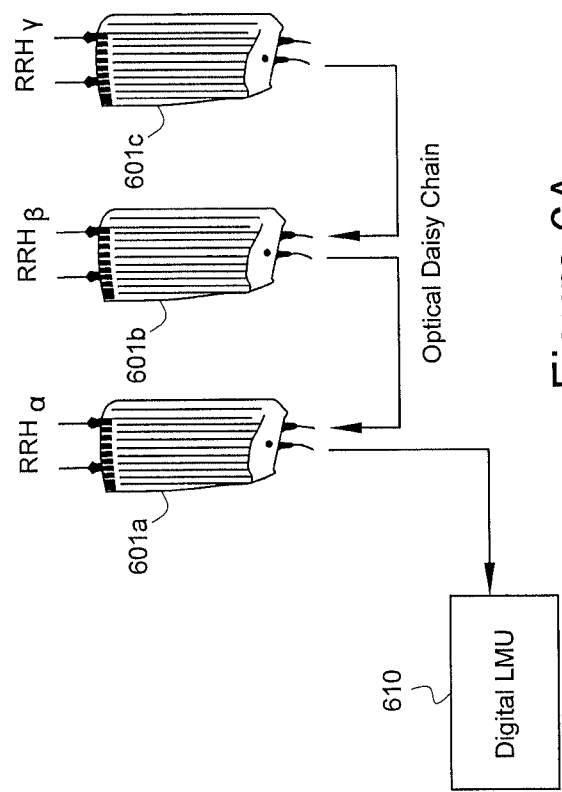

FIGS. 5A-5G depict an architecture with a single optical connection into the LMU. This is one option for cases where there is either one RRH unit, or RRH units are daisy chained together onto a single fiber. In some embodiments, multiple optical LMU connections are used, e.g., to support RRH units that are not daisy chained together, as may be the case when they are installed physically separated on a building perimeter, or where the bandwidth of the signals being processed by the RRH exceed the available bandwidth of the optical fiber. FIGS. 6A-6B illustrate the respective cases of a single (FIG. 6A) optical connection for transceivers 601*a*-*c*, and multiple (FIG. 6B) optical connections 603*a*, 603*b*, 603*c* for respective transceivers 602*a*, 602*b*, 602*c*, into the LMU 610 (FIG. 6A) or LMU 620 (FIG. 6B). For graphical simplicity, the optical to electrical converters are not shown in FIGS. 6A-6B but may be as described above in the context of FIGS. 4 and 5A-5C.

Figure 7:
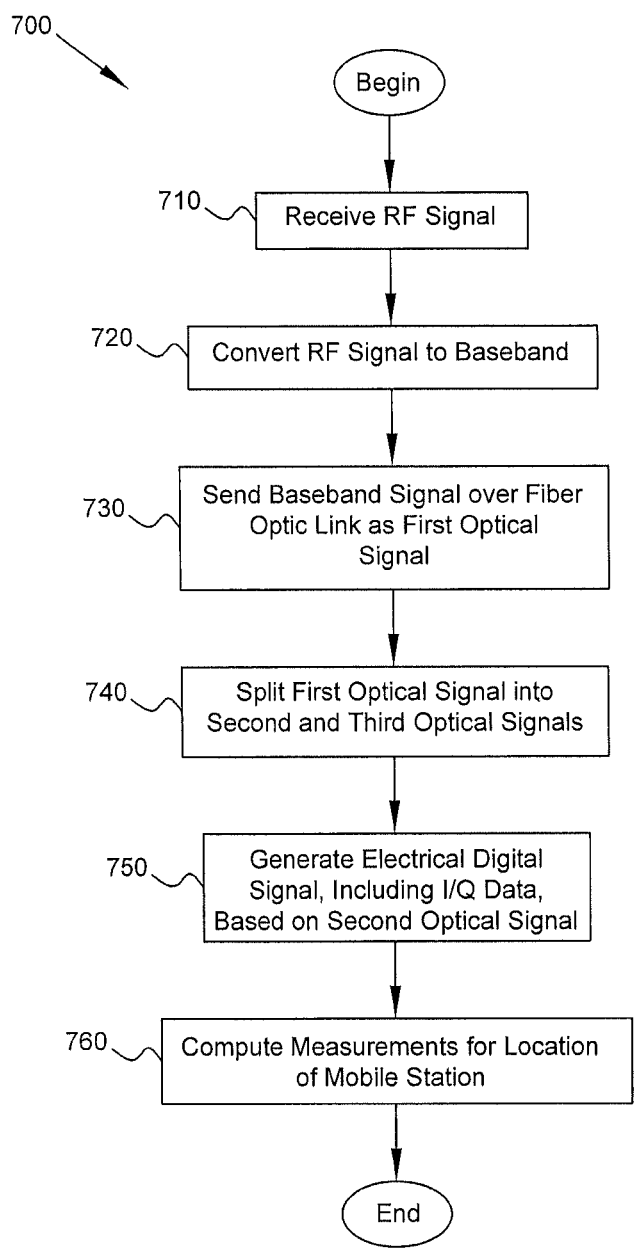
FIG. 7 is a flow diagram in accordance with some embodiments using passive optical coupling.

FIG. 7 is a flow diagram in accordance with some embodiments using passive optical coupling. After process 700 begins, an RF signal may be received (block 710) at an antenna mounted to a tower. The RF signal may be converted (block 720) to a baseband signal at a radio transceiver that is mounted near the top of the tower. The baseband signal may be sent (block 730) over a fiber optic link as a first optical signal. The first optical signal may be split (block 740) into a second optical signal and a third optical signal. The splitting may be performed at a location measurement unit (LMU) that performs the converting and the computing. A first electrical digital signal, including I/Q data, may be generated (block 750) based on the second optical signal. Based on the I/Q data, measurements for location of a mobile station may be computed (block 760).

Figure 8:
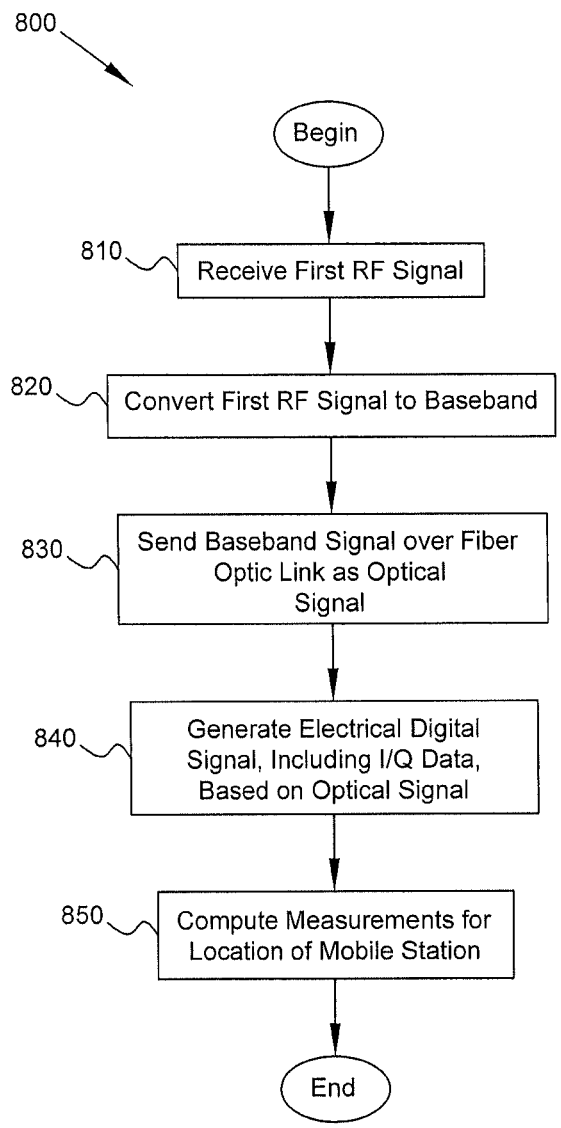
FIG. 8 is a flow diagram in accordance with some embodiments using active optical coupling.

FIG. 8 is a flow diagram in accordance with some embodiments using active optical coupling. After process 800 begins, a first RF signal may be received (block 810) at an antenna mounted to a tower. The first RF signal may be converted (block 820) to a baseband signal at a radio transceiver that is mounted near the top of the tower. The baseband signal may be sent (block 830) over a first fiber optic link as a first optical signal. A first electrical digital signal, including I/Q data, may be generated (block 840) based on the first optical signal. Based on the I/Q data, measurements for location of a mobile station may be computed (block 850). In some embodiments, the electrical digital signal may be converted into a second optical signal, which may be sent to a baseband processor via a second fiber optic link. In some embodiments, the electrical digital signal may be modulated to provide to provide a modulated signal, which may be upconverted to provide a second RF signal that is sent to a baseband processor via a coaxial cable.

Mobile location utilizing a digital LMU enhanced for RRH interfacing (e.g., digital LMU 400) may be performed in various ways. The digital LMU is capable of computing time, phase, and/or power measurements using I/Q data in the same manner as the RF (analog) LMU. Thus, techniques such as time difference of arrival (TDOA), angle of arrival (AOA), multiple range estimation location (MREL) (e.g., as described in U.S. Pat. Pub. No. 2010/0130225, "System and method for multiple range estimation location," to Alles et al.), and total flight time ratio pattern matching (TFTRPM) (e.g., as described in co-pending U.S. App. No. 61/421,485) may be applicable for Digital LMU location. The digital LMU may coexist within a coverage area deployed with RF LMU's, participating in multi-site location under coordination by a geolocation control server (GCS). Measurements from digital and RF LMU's may be used by the GCS for cooperative location.

In RRH environments where a multi-LMU site location is not possible, the digital LMU may operate in a proximity detector mode, identifying which RRH is hosting a target mobile call. This may be useful in coverage supplied by multiple RRH units simulcasting a common signal.

While examples of various embodiments have been described, it is to be understood that the embodiments described are illustrative only and that the scope of the invention is to be defined solely by the appended claims when accorded a full range of equivalence, many variations and modifications naturally occurring to those of skill in the art from a perusal hereof. For example, in some embodiments optical to electrical conversion may occur before splitting in the processing chain.

What is claimed is:
1. A base station comprising:
at least one antenna mounted to a structure, the at least one antenna configured to receive a radio frequency ("RF") signal;
a radio transceiver coupled to the at least one antenna and mounted to the structure, the transceiver configured to convert the RF signal to a baseband signal and format the baseband signal for transmission over a fiber optic link as a first optical signal;
an optical splitter configured to split the first optical signal, received via the fiber optic link, into a second optical signal and a third optical signal;

a baseband processor configured to process a message represented by the third optical signal; and a location measurement unit ("LMU") including:
an optical-to-electrical converter configured to convert the second optical signal into an electrical digital signal including in-phase and quadrature (I/Q) data;
an LMU digital logic circuit for extracting the I/Q data from the electrical digital signal; and
a computation module configured to compute, based on the I/Q data, measurements for location of an RF signal transmitter.

2. The base station of claim 1 wherein the fiber optic link is an uplink.

3. The base station of claim 1 wherein the fiber optic link is a downlink.

4. The base station of claim 1 wherein the optical splitter is located internal to the LMU.

5. The base station of claim 1, wherein the radio transceiver is configured to format the baseband signal using time division multiplexing to form the first optical signal.

6. The base station of claim 1, wherein the radio transceiver is configured to format the baseband signal into a plurality of data packets to form the first optical signal.

7. A base station comprising:
at least one antenna mounted to a structure, the at least one antenna configured to receive a first radio frequency ("RF") signal;
a radio transceiver coupled to the at least one antenna and mounted to the structure, the transceiver configured to convert the first RF signal to a first baseband signal and format the first baseband signal for transmission over a fiber optic link as a first optical signal;

a location measurement unit ("LMU") including:
an optical-to-electrical converter configured to convert the first optical signal into an electrical digital signal including in-phase and quadrature (I/Q) data;
an LMU digital logic circuit for extracting the I/Q data from the electrical digital signal;
a computation module configured to compute, based on the I/Q data, measurements for location of an RF signal transmitter; and
an electrical to optical converter configured to convert the electrical digital signal to a second optical signal; and
a baseband processor configured to process a message represented by the second optical signal.

8. The base station of claim 7 wherein the fiber optic link is an uplink.

9. The base station of claim 7 wherein the fiber optic link is a downlink.

10. The base station of claim 7 further comprising:
a device configured to modulate and upconvert either the first baseband signal or the electrical digital signal to a third RF signal for transmission to an RF band processor via a coaxial cable; and
the RF band processor configured to process a message represented by the third RF signal.

11. The base station of claim 7, wherein the radio transceiver is configured to format the first baseband signal using time division multiplexing to form the first optical signal.

12. The base station of claim 7, wherein the radio transceiver is configured to format the first baseband signal into a plurality of data packets to form the first optical signal.

* * * * *